J. R. McCUMBER.
VALVED HOSE CONNECTING CONDUIT.
APPLICATION FILED APR. 28, 1914.

1,124,933.

Patented Jan. 12, 1915.

Witnesses
Inventor
J. R. McCumber
By James J. Sheehy & Co.
Attorneys

UNITED STATES PATENT OFFICE.

JAMES R. McCUMBER, OF VICTORIA, VIRGINIA.

VALVED HOSE-CONNECTING CONDUIT.

1,124,933.  Specification of Letters Patent.  Patented Jan. 12, 1915.

Application filed April 28, 1914. Serial No. 834,990.

*To all whom it may concern:*

Be it known that I, JAMES R. MCCUMBER, citizen of the United States, residing at Victoria, in the county of Lunenburg and State of Virginia, have invented new and useful Improvements in Valved Hose-Connecting Conduits, of which the following is a specification.

My present invention pertains to couplings for hose, pipes and the like.

The object of the invention is to provide a coupling designed more especially, though not necessarily, for use in connection with the sprinkling hose of a locomotive, the said hose being designed to throw hot water under pressure against a locomotive for cleaning purposes, and the coupling being constructed with a view of automatically cutting off the hot water, steam, etc., in the event of the hose being blown off the coupling, as frequently happens because of the high pressure.

By effecting the closure of the passage through the coupling coincident with the displacement of the hose from the coupling, the coupling may be depended on to prevent the discharge of scalding water on the attendant using the hose, or upon any other person.

Figure 1:
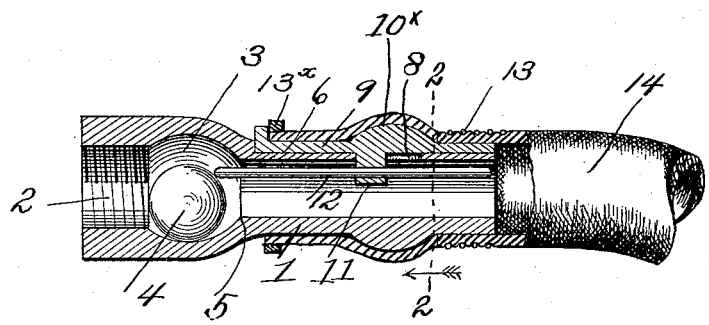
Figure 2:
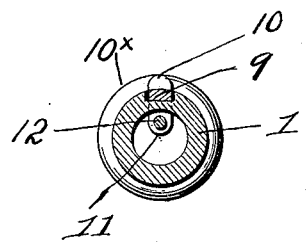

With the foregoing in mind, the invention will be fully understood from the following description and claims, when the same are read in connection with the drawings, accompanying and forming part of this specification, in which:

Figure 1 is a sectional view, with some of the parts in elevation, illustrating the coupling constituting the best practical embodiment of my invention that I have as yet devised. Fig. 2 is a transverse section taken in the plane indicated by the line 2—2 of Fig. 1, looking in the direction of the arrow, with the hose and the hose clamp omitted.

Similar numerals of reference designate corresponding parts in both views of the drawings:

The body 1 of my novel valved coupling is interiorly threaded at its inner end, as indicated by 2, to permit of the body being connected to a threaded cock or other appurtenance on a boiler or other source of water supply.

At an intermediate point of its length, the body 1 is provided with a chamber 3 to receive a ball valve 4, and in front of the said chamber 3 the body is provided with a valve seat 5.

The portion of the body 1 that extends forwardly from the seat 5, is provided at 6 with an exterior longitudinal groove, and formed in the wall of the said portion and communicating with the said groove is a longitudinal slot 8. Disposed and adapted to be moved longitudinally in the groove 6 is a slide 9, having, by preference, an exterior protuberance 10. On its inner side the slide 9 is provided with a projection 11, which extends inwardly through and is movable in the slot 8. To the said projection 11 is fixed in any approved manner a pin 12 which is arranged in the body of the coupling, and is designed under normal conditions to bear against the ball valve 4 so as to hold the said ball valve away from its seat and permit of the free passage of hot water through the coupling body.

It will be observed by reference to the drawing that the body 1 is provided at an intermediate point of its length with a swell or rounded enlargement $10^x$, and that when the slide 9 is in the position shown in Fig. 1, its protuberance 10 rests flush with said enlargement $10^x$.

Secured by suitable clamping means as 13 around the coupling body 1 and the slide 9, is a hose 14, designed to be used to discharge hot water on a locomotive with a view to cleaning the same. When secured as stated on the coupling body 1 and the slide 9, the hose operates to retain the slide and the pin 12 in the relative positions illustrated, and consequently the pin holds the valve 4 away from its seat, so that no obstruction is offered to the passage of the hot water through the coupling. In the event, however, of the hose 14 being blown off the coupling body, the slide and the pin will be left free to move outwardly. From this it follows that coincident with the displacement of the hose, the head of water will seat and close the valve, and consequently the displacement of the hose will be attended by the discharge of little or no water from the outer end of the coupling body.

It will be readily appreciated that the intermediate enlargement $10^x$ of the body 1 and the protuberance 10 on the slide 9 tend to prevent displacement of the hose 14; also, that because of the slide 9 having the protuberance 10, there is no liability of the slide working outwardly inside the hose. This is an important advantage, since it precludes casual movement of the valve 4 to its seat 5.

The construction illustrated and specifically described is the best embodiment of my invention of which I am cognizant, but it is to be understood that in the future practice of my invention such changes in structure may be made as fairly fall within the scope of my invention as defined in the claims appended.

In the preferred embodiment of the invention, the hose is carried over and beyond the protuberance 10 and up to the abutment on the slide 9, where it is secured by a clamp 13˟ of conventional or other suitable construction. When this arrangement is resorted to, the clamping means 13 may, if desired, be omitted.

Having described by invention, what I claim and desire to secure by Letters-Patent, is:

1. The combination in a valved hose coupling, of a conduit having a valve chamber and a valve seat and also having a portion extending forwardly from the valve seat, said portion being provided with an exterior swell or enlargement and a longitudinal slot and being also provided with an exterior longitudinal groove extending through said swell or enlargement and communicating with said slot; a slide movable in said groove and having an exterior abutment at its inner or rear end and an exterior protuberance at an intermediate point in its length, said protuberance resting flush with the swell or enlargement of the conduit when the slide is in its innermost or rear position, and also having an inwardly extending projection disposed in said slot; a longitudinally-disposed pin carried by said projection and extending into the valve chamber; a valve in said chamber normally held by said pin away from the seat; and a hose secured on the conduit and slide and arranged with its end against the abutment of the slide and operating to normally hold the slide and the pin against outward or forward movement.

2. The combination in a valved hose coupling, of a conduit having a valve chamber and a valve seat and also having a portion extending forwardly from the valve seat, said portion being provided with an exterior swell or enlargement and a longitudinal slot; a valve disposed in said chamber and constructed and arranged to be moved by pressure in the conduit against the valve seat; a longitudinally-movable slide having an exterior protuberance and also having a portion movable in the slot of the conduit; means carried by said slide for normally preventing movement of the valve to its seat; and a hose secured on the conduit and slide.

In testimony whereof I have hereunto set my hand in presence of two subscribing witnesses.

JAMES R. McCUMBER.

Witnesses:
R. E. JACKSON,
C. H. HOEY.